(12) United States Patent
Lin et al.

(10) Patent No.: US 9,396,155 B2
(45) Date of Patent: Jul. 19, 2016

(54) ENVELOPE DETECTION DEVICE AND RELATED COMMUNICATION DEVICE

(71) Applicant: ALI Corporation, Hsinchu (TW)

(72) Inventors: Kuo-Kai Lin, Hsinchu (TW);
Wei-Chun Kao, Hsinchu (TW);
Ching-Chung Cheng, Hsinchu (TW)

(73) Assignee: ALI Corporation, Hsinchu (TW)

( * ) Notice: Subject to any disclaimer, the term of this patent is extended or adjusted under 35 U.S.C. 154(b) by 0 days.

(21) Appl. No.: 14/600,016

(22) Filed: Jan. 20, 2015

(65) Prior Publication Data

US 2016/0103781 A1    Apr. 14, 2016

(30) Foreign Application Priority Data

Oct. 9, 2014    (CN) .......................... 2014 1 0527287

(51) Int. Cl.
| | |
|---|---|
| *H04B 1/00* | (2006.01) |
| *G06F 13/42* | (2006.01) |
| *H04B 17/00* | (2015.01) |
| *G06F 13/40* | (2006.01) |
| *H04B 1/69* | (2011.01) |

(52) U.S. Cl.
CPC ........ *G06F 13/4282* (2013.01); *G06F 13/4072* (2013.01); *H04B 17/00* (2013.01); *H04B 2001/6912* (2013.01)

(58) Field of Classification Search
CPC ... G06F 13/385; G06F 13/122; G06F 3/0601; G06F 3/0607; G06F 13/124
USPC ............ 375/139, 130, 316, 219, 377; 710/10, 710/306, 58, 105, 305, 313, 62, 316; 713/340
See application file for complete search history.

(56) References Cited

U.S. PATENT DOCUMENTS

| | | | | |
|---|---|---|---|---|
| 2007/0118674 | A1* | 5/2007 | Ulenas ................ | G06F 13/4045 710/305 |
| 2014/0207984 | A1* | 7/2014 | Maung ................. | G06F 13/385 710/105 |

* cited by examiner

*Primary Examiner* — Zewdu Kassa
(74) *Attorney, Agent, or Firm* — Winston Hsu; Scott Margo

(57) ABSTRACT

An envelope detection device for detecting a transmission signal of a high speed serial communication includes: an operation circuit, for receiving the transmission signal and generating a set of operated outputs according to the transmission signal and at least one reference signal; a reference signal generating circuit coupled to the operation circuit, for providing the reference signal to the operation circuit, wherein the reference signal generating circuit is operable to provide the reference signal with different voltage levels; and a comparing circuit coupled to the operation circuit, for comparing the set of calculated outputs to generate a comparison result. The envelope detection device detects a transmission state and a disconnect state of the high speed serial communication according to the comparison result generated based on the reference signals at different voltage levels.

17 Claims, 7 Drawing Sheets

ENVELOPE DETECTION DEVICE AND RELATED COMMUNICATION DEVICE

BACKGROUND OF THE INVENTION

1. Field of the Invention

The present invention relates generally to signal transmission, and more particularly, to an envelope detection device and communication device that detect transmission state and disconnect state of the signal transmission by sharing single comparison circuit.

2. Description of the Prior Art

For a communication device performing data transmission on the buses, it is important to correctly recognize transmission state of signals on the buses or connection states with other communication devices on the buses. For example, the communication device may detect signal levels on the buses by utilizing some envelope detectors. When signal levels are lower than certain thresholds, the communication device would recognize that no signals are currently on the buses. At this time, the communication device may enter specific states and may not process the signals received from the buses. Furthermore, the communication device may recognize that other remote communication device on the buses is disconnected if the signal level on the buses is, for example, higher than certain thresholds.

Taking a universal serial bus (USB) device on an USB bus as an example, the USB device may have to detect squelch state, Chirp J/K state (which is state related to handshake for switching from a reset period into a high-speed mode), and disconnect state that is related to connections between devices, depending on its operation mode (e.g. host mode or device). The receiver of the USB device may include multiple envelope detection devices (envelope detectors). These detectors are respectively responsible for comparing a potential difference between the signal lines D+ and D− of the USB bus (i.e., a USB differential signal) with multiple reference levels. For example, if it is detected that the differential signal is smaller than or equal to 100 mV, it is recognized as at the squelch state; and if it is detected that the differential signal is greater than or equal to 150 mV, it must not be recognized as the squelch state. Similarly, when the differential signal is greater than or equal to 300 mV, it is recognized as at the Chirp J state. When the differential signal is smaller than or equal to −300 mV, it is recognized as at the Chirp K state. Furthermore, when the differential signal is greater than or equal to 625 mV, it is recognized as at the disconnect state. When the differential signal is smaller than or equal to 525 mV, it must not be recognized as disconnect state.

From the above descriptions, the receiver needs multiple envelope detection devices and each envelope detection device needs respective comparison circuit and reference signal generation circuit in order to compare the differential signal on the signal lines D+ and D− with the reference signal at different levels (e.g. 100 mV, 150 mV, ±300 mV, 525 mV and 625 mV). However, the quantity of comparison circuits and reference signal generation circuits directly leads to an increase in circuitry complexity and manufacturing costs of the receiver.

SUMMARY OF THE INVENTION

With this in mind, it is one objective of the present invention to provide an inventive architecture of the envelope detection device, where multiple envelope detection devices share single comparing circuit to detect different transmission states and disconnect state. Furthermore, the present invention further provides a communication device based on the inventive envelope detection device.

According to a first aspect of the present invention, an envelope detection device for detecting a transmission signal in a high speed serial communication comprises: an operation circuit, a reference signal generation circuit and a comparison circuit. The operation circuit is employed for receiving the transmission signal and generating a set of operation outputs according to the transmission signal and at least one reference signal. The reference signal generation circuit is coupled to the operation circuit, and employed for providing the reference signal to the operation circuit, wherein the reference signal generation circuit is operable to provide the reference signal with different levels. The comparison circuit is coupled to the operation circuit, and employed for comparing the set of the operation outputs to generate a comparison result. The envelope detection device detects a transmission state and a disconnect state of the high speed serial communication according to comparison results that are generated based on the reference signal at different levels.

According to a second aspect of the present invention, a communication device comprises a physical layer circuit and a medium access control layer circuit. The physical layer circuit comprises an envelope detection circuit for detecting a transmission signal of a high speed serial communication carried out by the communication device. The envelope detection device comprises: an operation circuit, a reference signal generation circuit and a comparison circuit. The operation circuit is employed for receiving the transmission signal and generating a set of operation outputs according to the transmission signal and at least one reference signal. The reference signal generation circuit is coupled to the operation circuit, and employed for providing the reference signal to the operation circuit, wherein the reference signal generation circuit is operable to provide the reference signal with different levels. The comparison circuit is coupled to the operation circuit, and employed for comparing the set of the operation outputs to generate a comparison result. The envelope detection device detects a transmission state and a disconnect state of the high speed serial communication according to comparison results that are generated based on the reference signal at different levels. The medium access control layer circuit is coupled to the physical layer circuit, and employed for providing an output state selection signal to the envelope detection device, allowing the envelope detection device to detect one of the transmission state and the disconnect state of the high speed serial communication, and the reference signal generation circuit determines a level of the reference signal according to the output state selection signal, and the envelope detection device generates a corresponding state indication signal, the medium access control layer circuit operates according to the state indication signal.

As the inventive envelope detection device provided by the present invention can detect multiple different states of the communication, the quantity of the envelope detection device required by a communication device is significantly reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
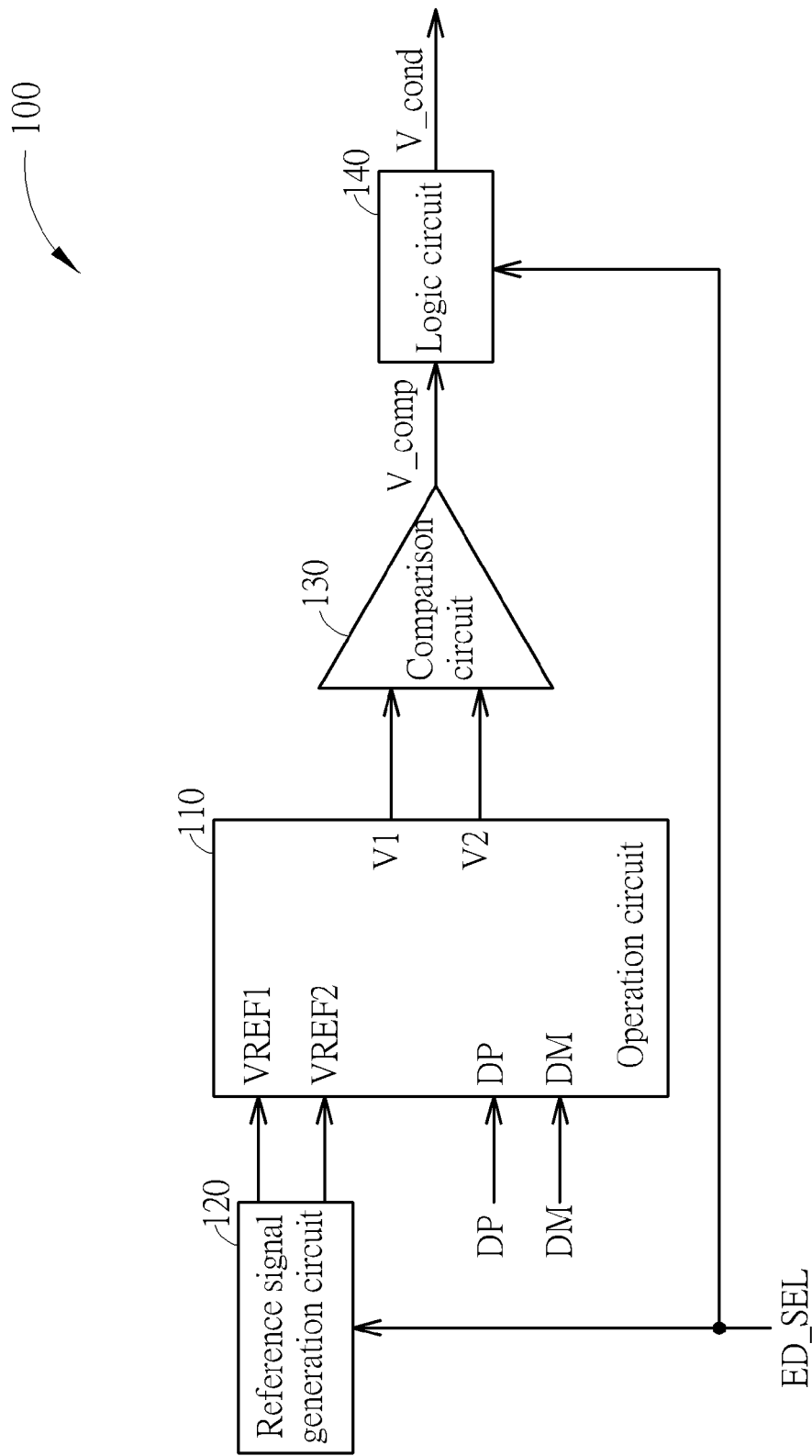
FIG. 1 illustrates a block diagram of an envelope detection device according to one embodiment of the present invention.

Please refer to FIG. 1, which illustrates a block diagram of an envelope detection device according to one embodiment of the present invention. As shown by figure, the envelope detection device 100 is intended for detecting a transmission signal of a high speed serial communication. The transmission signal is a differential signal, which consists of a set of complementary signals DP and DM. The envelope detection device 100 includes: an operation circuit 110, a reference signal generation circuit 120, and a comparison circuit 130.

To recognize different states of the high speed serial communication (e.g. USB communication), such as the squelch state, the Chirp J/K state, and the disconnect state, by using single comparison circuit only, the present embodiment relies on the operation circuit 110 and the reference signal generation circuit 120 to achieve the objective. According to the transmission signals DP and DM, and various thresholds corresponding to different states, different operation outputs will be obtained and provided to the comparison circuit 130 for comparison such that comparison results corresponding to different states can be generated.

The operation circuit 110 performs a calculation operation on the transmission signals DP and DM with the reference signal VREF1 or with the reference signals VREF1 and VREF2 to generate a set of operation results including a signal V1 and a signal V2 for the comparison circuit 130 to compare. In embodiments of the present invention, a difference between the signal V1 and the signal V2 is:

$$V1-V2=K[(DP-DM)-(VREF2-VREF1)]; \text{ or}$$

$$V1-V2=K[(DP-DM)-(VREF1)];$$

Hence, even though the comparison circuit 130 apparently compares the signal V1 with the signal V2, the outcome is substantially equal to the result of compare (DP−DM) with (VREF2−VREF1), or (DP−DM) with VREF1. As mentioned above, when the differential signal is greater than 150 mV, it must not be recognized as the squelch state, and when the differential signal is smaller than 100 mV, it is recognized as the squelch state. Hence, an average of 100 mV and 150 mV could be used as the determination threshold. Therefore, for instance, as long as the reference signals VREF1 and VREF2 generated by the reference signal generation circuit 120 meet the condition that (VREF2−VREF1) is equal to 125 mV or the condition that VREF1 is equal to 125 mV, the envelop detection device 100 is able to detect the squelch state. However, this is not intended to be a limitation of the present invention. In various embodiments of the present invention, the reference signal generation circuit 120 could generate two sets of outputs respectively corresponding to 100 mV and 150 mV, and the comparison circuit 130 compares V1 and V2 for the determination threshold of 100 mV and the determination threshold of 150 mV, respectively. According to the comparison result V_comp of the comparison circuit 130, whether the USB communication enters the squelch state may thus be determined. For instance, when the comparison result V_comp indicates V1 is smaller than V2, the USB communication is determined to enter the squelch state. Similarly, based on the same principle of determining Chirp J/K state, the reference signal generation circuit 120 will have the reference signals VREF1 and VREF2 meet the condition that VREF2−VREF1 is equal to 300 mV, or VREF1 is equal to 300 mV (for Chirp J state); or VREF2−VREF1 is equal to −300 mV, or VREF1 is equal to −300 mV (for Chirp K state). Accordingly, the Chirp J/K state could be detected based on the comparison result V_comp of the comparison circuit 130. For the disconnect state, any voltage between 525 mV and 625 mV can be used to generate the reference signal VREF1, or references signals VREF1 and VREF2. Alternatively, using both 525 mV and 625 mV to generate two reference signals VREF1 (or reference signals VREF1 and VREF2), and the comparison circuit 130 compares twice.

In one embodiment, the envelope detection device 100 is controlled by an output state selection signal ED_SEL. The output state selection signal ED_SEL may be used to select one of the above mentioned states of the USB communication the envelope detection device 100 should detect, and the reference signal generation circuit 120 accordingly generates corresponding reference signals VREF1 and VREF2.

Figure 2:
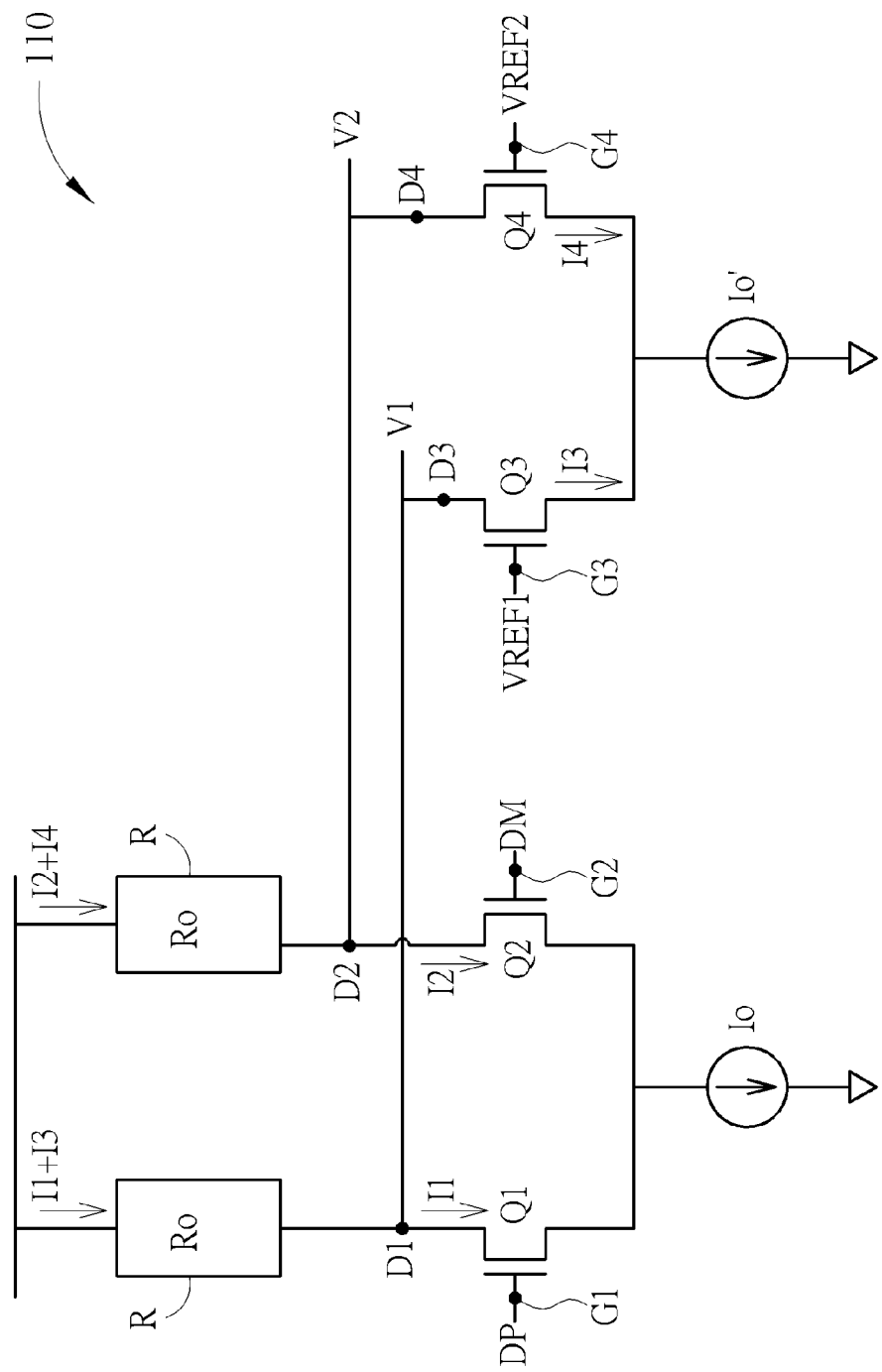
FIG. 2 illustrates a circuit diagram of a first embodiment of the operation circuit of the envelope detection device.

In following embodiments of the present invention, a variety of implementations of the operation circuit 110 are illustrated. At first, please refer to a first embodiment of the present invention as shown in FIG. 2. In the first embodiment, the operation circuit 110 includes two differential pairs, one of which is comprised of transistors Q1 and Q2, while the other of which is comprised of transistors Q3 and Q4. The differential pair comprised of transistors Q1 and Q2 is biased by a current source $I_o$, and the differential pair comprised of transistors Q3 and Q4 is biased by a current source $I_o'$. Currents flowing through each transistor are designated as shown in figure. Control ends G1 and G2 (e.g. gates) of the transistors Q1 and Q2 are respectively coupled to the transmission signals DP and DM, and control ends G3 and G4 (e.g. gates) of the transistors Q3 and Q4 are respectively coupled to the reference signal VREF1 and VREF2. Based on the operating principles of the differential pair, the differential current (I1−I2) is in direct proportion to the signal difference (DP−DM) between the gates of transistor, where a ratio of (I1−I2) to (DP−DM) is a differential transconductance of the transistors Q1 and Q2, and the relationship could be represented as:

$$I1-I2=K1*(DP-DM);$$

where K1 is the differential transconductance of the transistors Q1 and Q2; and the difference between current I3 and I4 could be represented as:

$$I3-I4=K2*(VREF1-VREF2);$$

where K2 is the differential transconductance of the transistors Q3 and Q4.

If the current sources Io and Io' provide identical bias current, and the transistors Q1 to Q4 are identical in characteristics, then K1=K2=K. Thus, the above equations can be summed as:

$$(I1+I3)-(I2+I4)=K(DP-DM)+K(VREF1-VREF2).$$

Accordingly, multiplying terms on two sides of the equation by the resistance Ro of the load R, the following will be obtained:

$$Ro[(I1+I3)-(I2+I4)]=Ro*K[(DP-DM)+(VREF1-VREF2)].$$

Further, Ro [(I1+I3)−(I2+I4)] is actually the potential different between the first end D1 (e.g. the drain) of the transistor Q1 and the first end D2 (e.g. the drain) of transistor Q2. Hence, if voltage levels on these two nodes (D1 and D2) respectively serve as the operation outputs V1 and V2 of the operation circuit 110, this would lead to:

$$V1-V2=Ro*K[(DP-DM)-(VREF2-VREF1)].$$

The comparison circuit 130 compares the operation output V1 with the operation output V2, and could derive the comparison result of V1>V2, or the comparison result of V1<V2. Hence, when the comparison circuit 130 detects V1>V2, it represents V1−V2>0 and thus (DP−DM) is greater than (VREF2−VREF1). When the comparison circuit 130 detects V1<V2, it thus represents (DP−DM) is smaller than (VREF2−VREF1). As long as levels of the reference signals VREF1 and VREF2 that are generated by the reference signal generation circuit 120 can be properly set, the comparison circuit 130 can correctly recognize different states.

Figure 3:
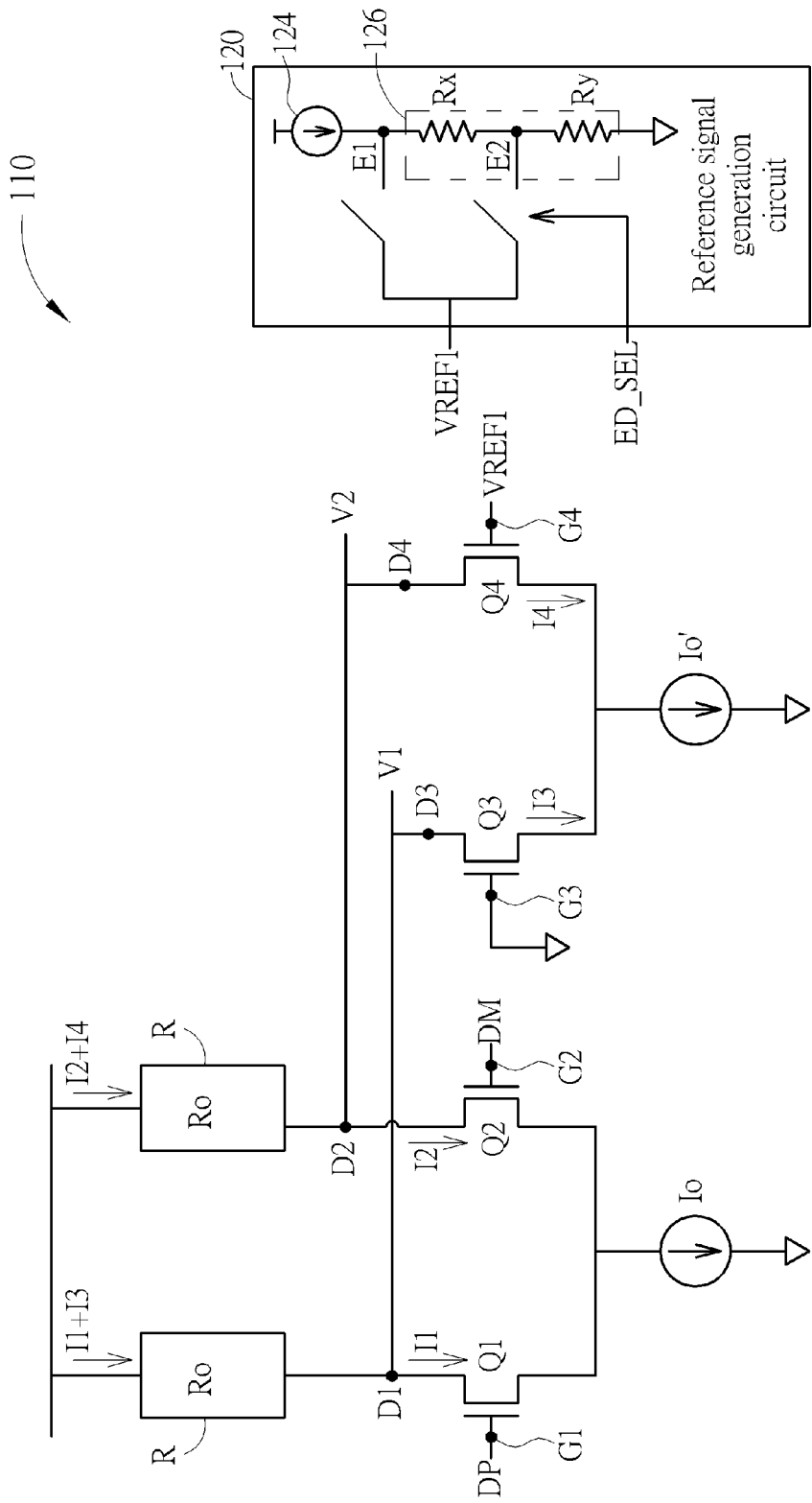
FIG. 3 illustrates a circuit diagram of a second embodiment of the operation circuit of the envelope detection device.

FIG. 3 illustrates a second embodiment of the operation circuit 110. This embodiment is generally similar to the first embodiment in configuration, and repeated descriptions are omitted here. The difference between the second embodiment and the first embodiment is that the control end G3 of the transistor Q3 is coupled to a ground and the control end G4 of the transistor Q4 is coupled to the reference signal VREF1 in the second embodiment. Hence, if voltage levels on drains D1 and D2 of the transistor Q1 and Q2 respectively serve as operation outputs V1 and V2 of the operation circuit 110, this leads to a result:

$$V1-V2=Ro*K[(DP-DM)-VREF1];$$

Figure 4:
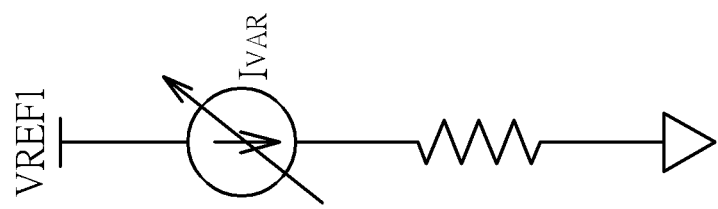
FIG. 4 illustrates a circuit diagram of an embodiment of the reference signal generation circuit of the envelope detection device.

Hence, when the comparison circuit 130 detects V1>V2, (DP−DM) is greater than VREF1; otherwise, (DP−DM) is smaller than VREF1. In this embodiment, even though the reference signal generation circuit 120 only generates the reference signal VREF1 instead of both VREF1 and VREF2, this embodiment still achieves the same result as the first embodiment which generates a set of reference signals. In addition, in this embodiment, the reference signal generation circuit 120 can be implemented with the architecture shown on the right side of FIG. 3, where the reference signal generation circuit 120 includes a constant current source 124 and a resistor network 126. Based on the output state selection signal ED_SEL, the reference signal generation circuit 120 may selectively change connection between its output terminal (labeled with VREF1) and nodes E1 or E2 of the resistor network 126. When the output terminal is connected to the node E1, the reference signal VREF1 with higher level could be obtained. When the output terminal is connected to the node E2, the reference signal VREF1 with lower level could be obtained. If the resistor network 126 includes more resistive elements (eg. resistors) and nodes, various and different voltage levels of the reference signal VREF1 can be obtained. In addition, the reference signal generation circuit 120 could be also implemented by a single resistive element and an adjustable current source as shown by FIG. 4. Specifically, different levels of the reference signal VREF1 can be obtained by varying an output current of the adjustable current source $I_{VAR}$.

Figure 5:
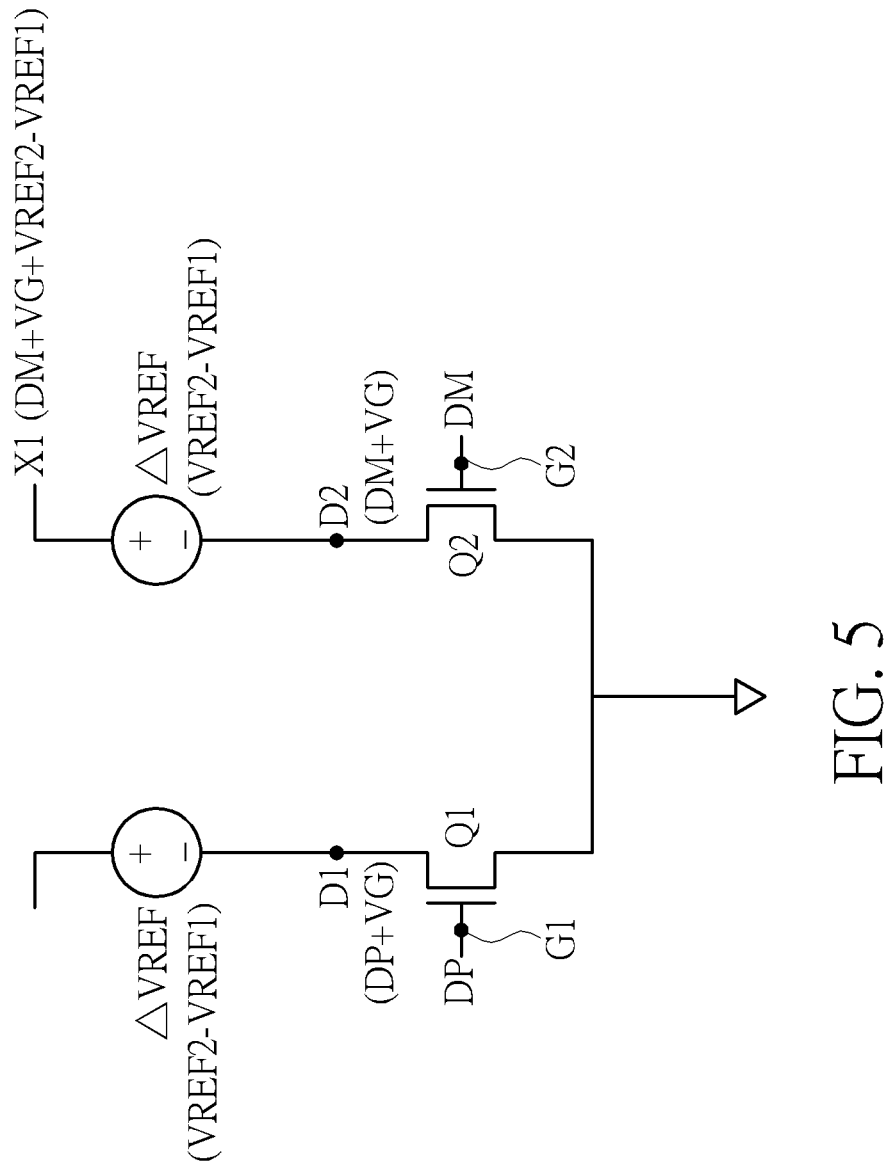
FIG. 5 illustrates a circuit diagram of a third embodiment of the operation circuit of the envelope detection device.

FIG. 5 illustrates a third embodiment of the operation circuit 110 of the present invention. The operation circuit 110 includes a differential pair that is comprised of transistors Q1 and Q2. Gates G1 of the transistor Q1 and G2 of the transistor Q2 are respectively coupled to the transmission signals DP and DM. Assuming that the voltage difference across the gate G1 and the drain D1 of the transistor Q1 and the voltage difference across the gate G2 and the drain D2 of the transistor Q2 are both VG (because the transistors Q1 and Q2 consist of a differential pair, voltage differences across their corresponding nodes would be identical), the voltage level on the drain D1 of the transistor Q1 and the voltage level on the drain D2 of the transistor Q2 is (DP+VG) and (DM+VG), respectively. Moreover, both of the drain D1 and the drain D2 are connected to the same controlled voltage source ΔVREF, wherein the controlled voltage source ΔVREF provides a potential difference of (VREF2−VREF1). If the drain D1 of the transistor Q1 serves as the operation output V1 of the operation circuit 110, and the node X1 serves as the operation output V2 of the operation circuit 110, this could lead to the following equation:

$$V1-V2=(DP-DM)-(VREF2-VREF1)$$

Hence, different comparison results of the comparison circuit 130 can reflect either (DP−DM) is greater than (VREF2−VREF1) or (DP−DM) is smaller than (VREF2−VREF1).

Figure 6:
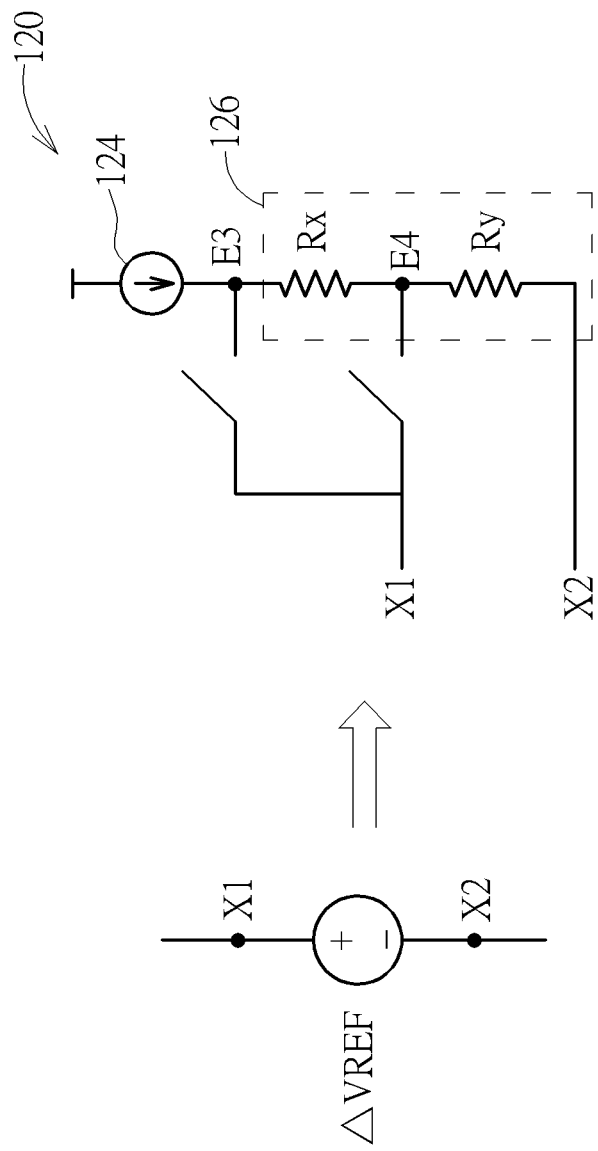
FIG. 6 illustrates a circuit diagram of another embodiment of the reference signal generation circuit of the envelope detection device.

In this embodiment, the controlled voltage source ΔVREF can be implemented with the reference signal generation circuit 120 as shown by FIG. 6, wherein output terminals corresponding to reference signals VREF2 and VREF1 could respectively serve as nodes X1 and X2 of the voltage source ΔVREF. The output state selection signal ED_SEL could be used to select connection between the output terminal and the node E3 or between the output terminal and node E4 of the resistor network, which leads to different values of (VREF2−VREF1). In addition, in this embodiment, the controlled voltage source ΔVREF could be implemented with architecture shown in FIG. 4, including an adjustable current source and a resistive element, which uses two ends of the resistive element as output terminals E3 and E4 of the voltage source ΔVREF.

Please refer to FIG. 1 again. Although the comparison result V_comp generated by the comparison circuit 130 can recognize a specific transmission state or a specific connection state, the comparison result V_comp could be further processed by a logic circuit 140 before it serves as a state indication. By doing so, the signal quality of the comparison result V_comp can be improved. In one embodiment, the logic circuit 140 could include a filter circuit, a de-glitch circuit, and/or a delay circuit. The logic circuit 140 could perform further processing on the comparison result V_comp generated by the comparison circuit 130 to generate a state indication signal V_cond such that misjudgments on states can be prevented and detection accuracy can be improved. However, the logic circuit 140 could be omitted in some embodiments. Hence, the envelope detection device 100 may directly use the comparison result V_comp generated by the comparison circuit 130 to indicate states of the USB communication.

Because the USB device detects the squelch state, Chirp J/K state, and the disconnect state during different operation phases of the USB communication, the inventive envelope detection device 100 will not cause resource contention even if the different states are detected by a same comparison circuit.

Figure 7:
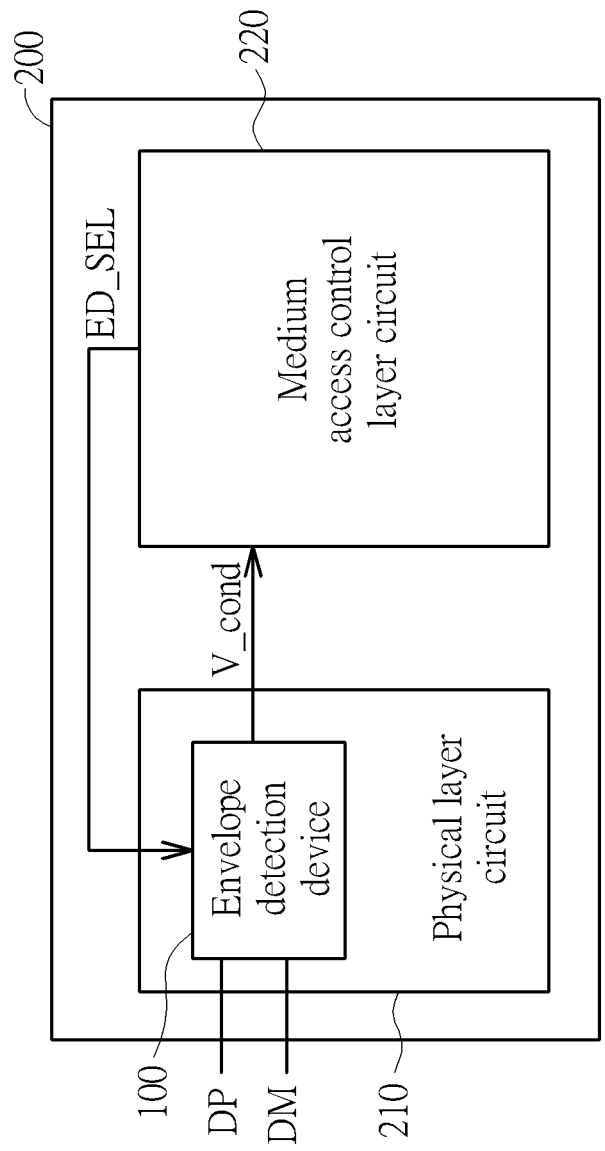
FIG. 7 illustrates a block diagram of a communication device according to one embodiment of the present invention.

Based on the above-mentioned envelope detection device 100, the present invention further provides a communication device, which is operable in host mode of the USB communication or in device mode of the USB communication. Architecture of the communication device is illustrated in FIG. 7. As shown, a communication device 200 includes a physical (PHY) layer circuit 210 and a medium access control (MAC) layer circuit. The PHY layer circuit 210 includes a USB transceiver, which is used for receiving/transmitting the transmission signals DP and DM from/to the USB bus, encoding/decoding, modulating/demodulating the transmission signal. The PHY layer circuit 210 also includes the envelope detection device 100 of FIG. 1, for detecting the transmission state and the disconnect state of the USB communication. The transmission state includes at least one of the squelch state and the Chirp J/K state. The MAC layer circuit 220 issues the output state selection signal ED_SEL to the PHY layer circuit 210 to determine which state the envelope detection device 100 should detect, and instructs the envelope detection device 100 to generate the state indication signal V_comp for indicating the detected state. Furthermore, after the envelope detection device 100 receives the output state selection signal ED_SEL, the reference signal generation circuit 120 also generates corresponding reference signal, allowing the comparison circuit 130 to generate the comparison result, thus indicating the transmission state and the disconnect state. As a result, the MAC layer circuit 220 performs corresponding operations according to the state indication signal V_comp.

Please note that even though the transmission state (squelch state and Chirp J/K) and the disconnect state of the USB communication are mentioned for the purpose of explanation in the above descriptions, the inventive envelope detection device is also feasible to any types of data transmission interface. As long as a data transmission interface needs to detect multiple transmission states and disconnect state (having different determination thresholds), and uses differential signaling, the inventive envelope detection device can be applied to such data transmission interface to simplify the circuitry complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An envelope detection device for detecting a transmission signal in a high speed serial communication, comprising:
   an operation circuit, for receiving the transmission signal and generating a set of operation outputs according to a difference between the transmission signal and at least one reference signal;
   a reference signal generation circuit, coupled to the operation circuit, for providing the reference signal to the operation circuit, wherein the reference signal generation circuit is operable to provide the reference signal with different levels; and
   a comparison circuit, coupled to the operation circuit, for comparing the set of the operation outputs to generate a comparison result;
   wherein the envelope detection device detects a transmission state and a disconnect state of the high speed serial communication according to the comparison results that are generated based on the reference signal at different levels.

2. The envelope detection device of claim 1, wherein the high speed serial communication is a universal serial bus communication.

3. The envelope detection device of claim 2, wherein the transmission state is one of squelch state and Chirp J/K state, or includes both squelch state and Chirp J/K state.

4. The envelope detection device of claim 1, wherein the transmission signal is differential and includes a set of complementary signals, the operation circuit includes a first transistor differential pair and the first transistor differential pair comprises:

a first transistor, having a control end being coupled to a first transmission signal of the set of complementary signals; and
   a second transistor, having a control end being coupled to a second transmission signal of the set of complementary signals;
   wherein the set of the operation outputs are determined by levels on a first end of the first transistor and a first end of the second transistor, respectively.

5. The envelope detection device of claim 4, wherein the operation circuit further comprises a second transistor differential pair and the second transistor pair comprises:
   a third transistor, having a first end being coupled to the first end of the first transistor; and
   a fourth transistor, having a first end being coupled to the first end of the second transistor;
   wherein the reference signal generation circuit further generates a first reference signal and a second reference signal, and a control end of the third transistor is coupled to the first reference signal, a control end of the fourth transistor is coupled to the second reference signal; the set of operation outputs are respectively provided by the first end of the first transistor and the first end of the second transistor.

6. The envelope detection device of claim 4, wherein the operation circuit further comprises a second transistor differential pair and the second transistor differential pair comprises:
   a third transistor, having a first end being coupled to the first end of the first transistor; and
   a fourth transistor, having a first end being coupled to the first end of the second transistor;
   wherein a control end of the third transistor is coupled to a ground, and a control end of the fourth transistor is coupled to the reference signal; the sets of the operation outputs are respectively provided by the first end of the first transistor and the first end of the second transistor.

7. The envelope detection device of claim 4, wherein the reference signal generation circuit is a controlled voltage source, a potential difference between a first terminal and a second terminal of the controlled voltage source is the reference signal, the first end of the first transistor and the first end of the second transistor are respectively coupled to the first terminal of the controlled voltage source, and the set of operation outputs are respectively provided by the first end of the first transistor and the second terminal of the controlled voltage source.

8. The envelope detection device of claim 1, wherein the reference signal generation circuit includes a resistor network and a constant current source, the resistor network includes multiple nodes, and the reference signal generation circuit determines a level of the reference signal by controlling connections between the nodes and an output terminal of the reference signal generation circuit.

9. The envelope detection device of claim 1, wherein the reference signal generation circuit includes a resistive element and an adjustable current source, the reference signal generation circuit determines a level of the reference signal by adjusting a current provided by the adjustable current source.

10. The envelope detection device of claim 1, wherein the reference signal generation circuit generates the reference signal with different levels during different operation phases of the high speed serial communication.

11. The envelope detection device of claim 1, further comprising:

a logic circuit, coupled to the comparison circuit, for receiving the comparison result to generate a state indication signal that indicates the transmission state and the disconnect state of the high speed serial communication.

12. The envelope detection device of claim 11, wherein the logic circuit performs a filtering operation, a de-glitch operation, or a delay operation upon the comparison result to generate the state indication signal.

13. A communication device, comprising:
a physical layer circuit, comprising:
   an envelope detection circuit, for detecting a transmission signal of a high speed serial communication carried out by the communication device, comprising:
      an operation circuit, for receiving the transmission signal and generating a set of operation outputs according to a difference between the transmission signal and at least one reference signal;
      a reference signal generation circuit, coupled to the operation circuit, for providing the reference signal to the operation circuit, wherein the reference signal generation circuit is operable to provide the reference signal with different levels; and
      a comparison circuit, coupled to the operation circuit, for comparing the set of the operation outputs to generate a comparison result;
   wherein the envelope detection device detects a transmission state and a disconnect state of the high speed serial communication based on the reference signal at different levels; and
a medium access control layer circuit, coupled to the physical layer circuit, for providing an output state selection signal to the envelope detection device, allowing the envelope detection device to detect one of the transmission state and the disconnect state of the high speed serial communication, and the reference signal generation circuit determines a level of the reference signal according to the output state selection signal, and the envelope detection device correspondingly generates a state indication signal; the medium access control layer circuit operates according to the state indication signal.

14. The communication device of claim 13, wherein the high speed serial communication is a universal serial bus communication and the transmission state is one of squelch state and Chirp J/K state, or includes both squelch state and Chirp J/K state.

15. The communication device of claim 14, wherein the USB device is operable in either host mode or device mode.

16. The communication device of claim 13, wherein the medium access control layer circuit generates different output state selection signals during different operation phases of the high speed serial communication such that the reference signal generation circuit accordingly generates the reference signal with different levels, thereby providing the state indication signal corresponding to one of the transmission state and the disconnect state.

17. The communication device of claim 13, wherein the envelope detection device further comprises:
a logic circuit, coupled to the comparison circuit, for receiving the comparison result to generate the state indication signal.

* * * * *